Dec. 17, 1946.   A. J. BRUNNER   2,412,671
MOLDING APPARATUS
Filed Nov. 12, 1943   3 Sheets-Sheet 1

INVENTOR
A.J. BRUNNER
BY Harry L. Duft
ATTORNEY

Dec. 17, 1946.  A. J. BRUNNER  2,412,671
MOLDING APPARATUS
Filed Nov. 12, 1943  3 Sheets-Sheet 3

INVENTOR
A. J. BRUNNER
BY
ATTORNEY

Patented Dec. 17, 1946

2,412,671

UNITED STATES PATENT OFFICE 2,412,671

MOLDING APPARATUS

Anton J. Brunner, Congress Park, Ill., assignor to Western Electric Company, Incorporated, New York, N. Y., a corporation of New York Application November 12, 1943, Serial No. 509,983

6 Claims. (Cl. 18—30)

This invention relates to molding apparatus and more particularly to an apparatus for injection molding rubber articles.

In the manufacture of rubber articles and particularly of rubber articles having an insert therein such as electrical connector cables, the ends of which are incased in a rubber housing, one practice has been to compression mold the casings over the cable ends from a powdered molding composition. Where, however, the casings are to be used to form a joint which will be impervious to water or to air, even under pressure, compression molded casings are not always satisfactory.

An object of the present invention is to provide an effective and efficient apparatus for injection molding rubber articles.

In accordance with one embodiment of this invention, an injection molding apparatus may be provided having a movable sectional die which may be withdrawn from the injecting position along a slide which is heated to keep the die at the correct molding temperature. The slide is also provided with a mechanism for separating the die sections and for reassembling them after removal of the molded part.

Figure 1:
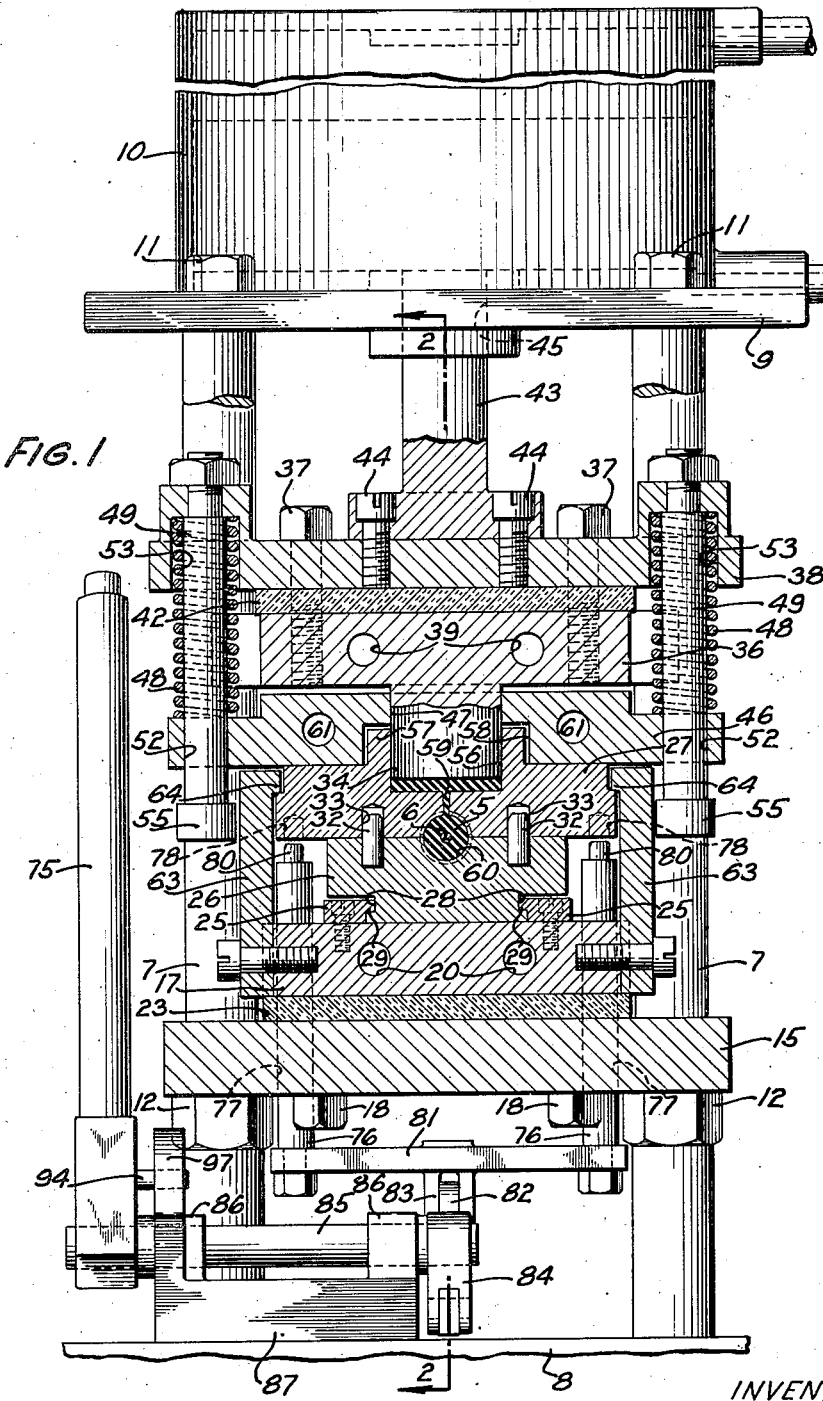
Figure 2:
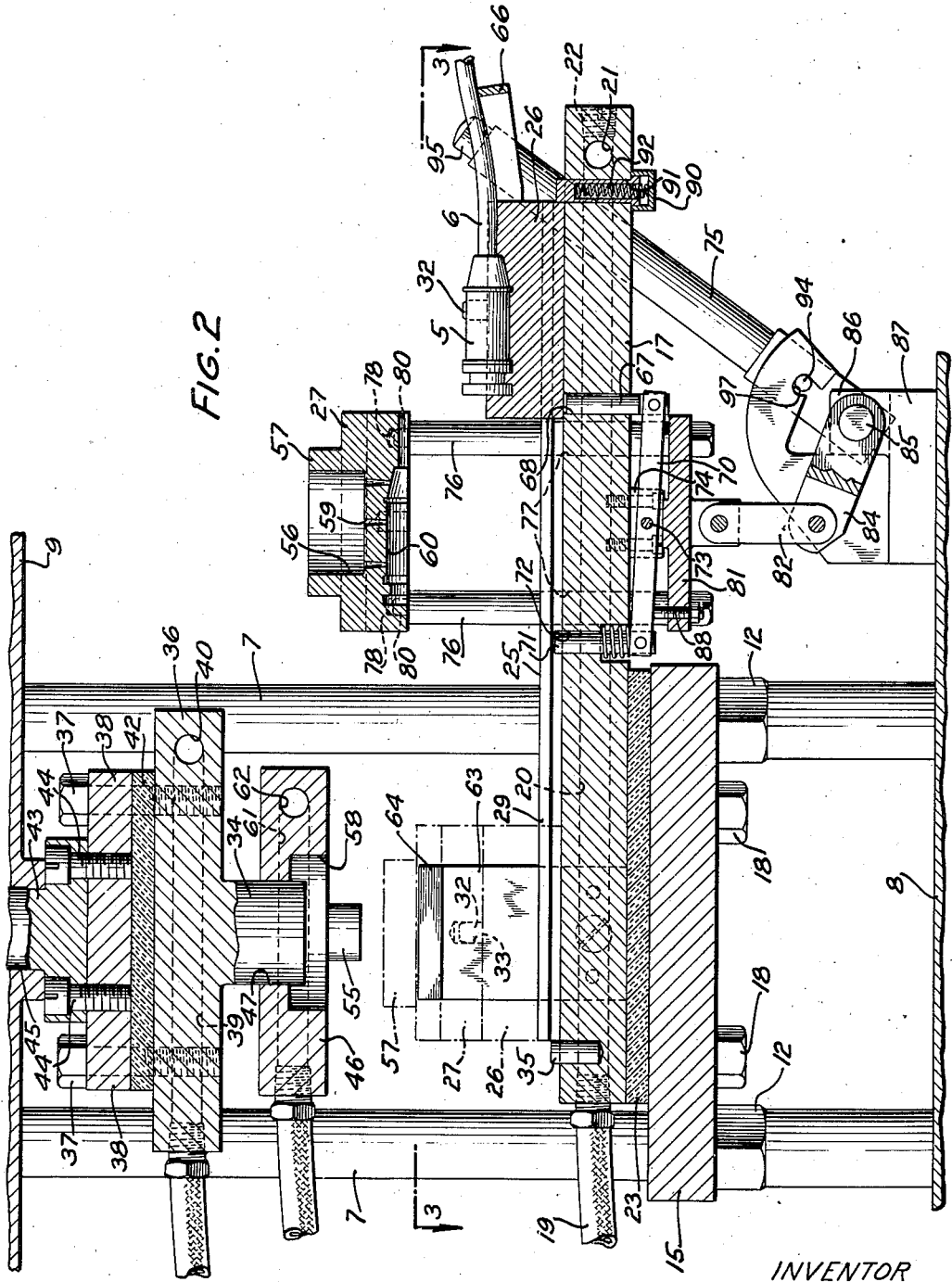
Figure 3:
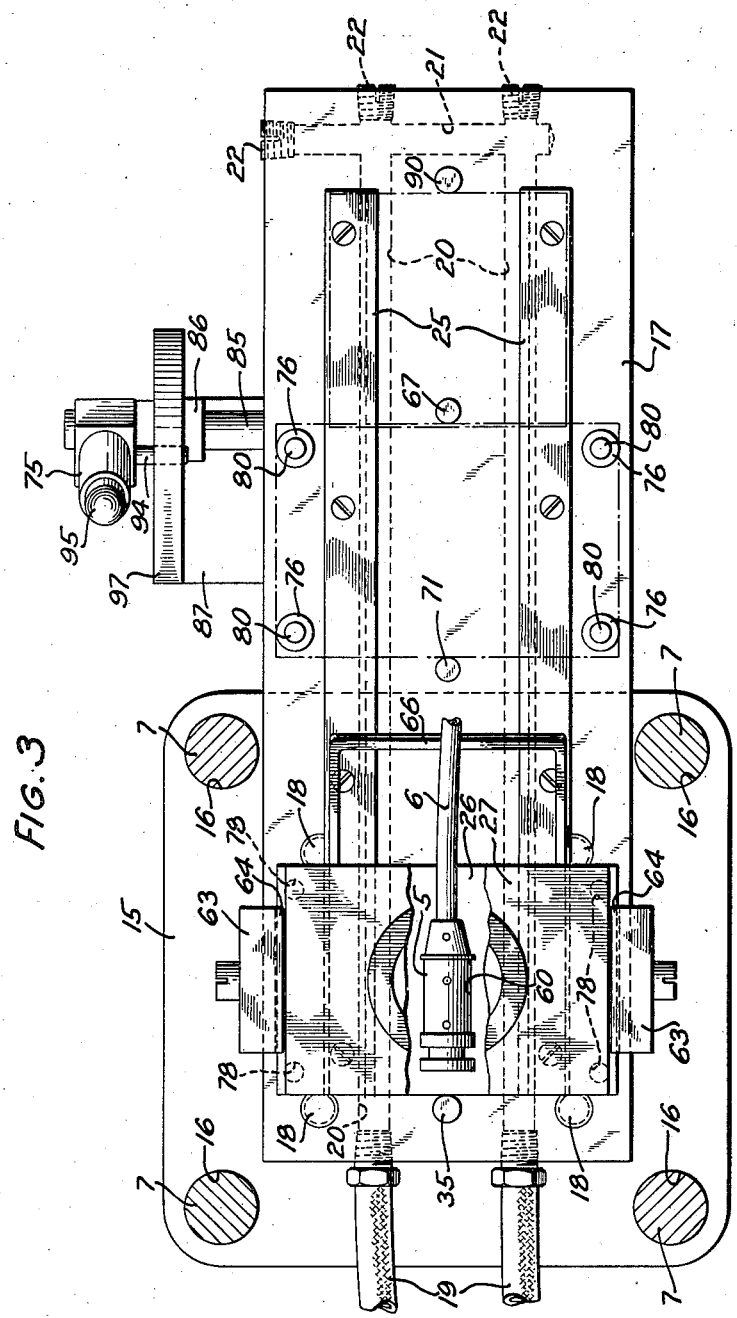

Other objects and advantages of the present invention will be apparent from the following detailed description taken in conjunction with the drawings, wherein Fig. 1 is a rear elevation, partly in section, of an injection molding apparatus constructed in accordance with this invention;

Fig. 2 is a vertical sectional view along the line 2—2 of Fig. 1, showing the ram in elevated position; and Fig. 3 is a horizontal sectional view partly in plan along the line 3—3 of Fig. 2, a portion of the view being broken away to show a molded part in plan.

Referring now to the drawings wherein an apparatus is illustrated for injection molding a rubber casing 5 about an end of a connector cable 6, it will be seen that four upright standards 7 are mounted on a base 8 such as a work table top and connected at their upper ends to a cross plate 9 which is integrally formed with the lower end of a pressure cylinder 10, the cross plate 9 being rigidly fixed to the upper ends of the standards 7 by a number of nuts 11. A fixed rectangular bolster plate 15 having apertures 16 formed in the four corners thereof to permit the standards 7 to extend therethrough, is mounted on the lower portions of the standards by a number of nuts 12 which are threaded to the standards 7 and support the plate 15 on their surfaces.

As may be seen in Figs. 1 and 2, an elongated rectangular platen 17 is mounted on the bolster plate 15, being fixed thereto by a number of bolts 18 which are mounted in the bolster plate 15 and are threaded into the left portion, as viewed in Fig. 2, of the platen 17. The platen 17 is heated by passing steam or heated gases through hoses 19 connected to a pair of ducts 20 which extend longitudinally through the platen and which are connected at their right ends, as viewed in Figs. 2 and 3, by a cross duct 21. Threaded plugs 22 are positioned in the open ends of these ducts, as shown in Fig. 3, and may be removed to permit cleaning of the ducts. Since the platen is heated, a layer 23 of heat insulating material is positioned between the platen and the bolster plate 15 to reduce the heat loss therebetween.

A pair of spaced parallel retaining plates 25 are mounted on the upper surface of the platen 17 and extend longitudinally therealong. These plates serve both as retaining members and as guiding members for a sectional die comprising a lower section 26 and an upper section 27, the lower section being provided with longitudinally extending grooves 28 formed along the sides thereof which are engaged by projecting portions 29 of the retaining plates 25 to retain the lower section on the platen.

The lower die section 26 is slidable on the upper surface of the heated platen 17 and is maintained thereby at the desired molding temperature during the operation of this apparatus, thus substantially avoiding the loss of time usually incurred by the period required for bringing the die to molding temperature. As the die sections are assembled, as will be hereinafter explained, they are aligned with respect to each other by a pair of vertically disposed pins 32 which are dowelled in the lower section 26 and extend into and engage the walls of cylindrical recesses 33 formed in the upper die section 27. After the two sections have been assembled, they are moved along the platen 17 and into position under a heated molding ram 34, a vertically disposed stop member 35 being mounted in the left portion of the platen 17, as shown in Fig. 2, and extending above the surface thereof, so as to engage the left edge of the lower die member 26 when the die assembly is in proper position.

The ram 34 is integrally formed with the underside of a heated block 36, supported by a number of bolts 37 mounted in a vertically movable bolster plate 38 and threadedly engaging the block 36. The ram block 36 is heated similarly to the platen 17, being provided with a pair of longitudinally extending ducts 39 and a cross duct 40, which interconnects the right ends of the ducts 39, as shown in Fig. 2. A layer 42 of heat insulating material, similar to the layer 23, separates the block 36 from the bolster plate 38. The bolster plate 38 is itself fixed to the lower end of a piston 43 by a number of bolts 44 associated therewith, the upper portion of the piston 43 extending into the pressure cylinder 10 through an aperture 45 formed in the cross plate 9.

During the first part of the molding operation, the ram does not itself exert sufficient clamping pressure on the die section and consequently, during the initial movement of the ram, supplementary clamping pressure is required to hold the die sections together. In the present apparatus, this is provided, as may be seen in Figs. 1 and 2, by a heated clamping plate 46 which is associated with the ram 34, the ram extending through an aperture 47 formed through the center portion thereof. The clamping plate is vertically movable relatively to the ram and is normally urged downwardly by a pair of helical springs 48 positioned about vertically disposed rods 49 which are mounted on the underside of the bolster plate 38 and extend downwardly through apertures 52 formed in the clamping plate. The upper ends of the springs 48 are positioned in cylindrical recesses 53 formed in the bolster plate 38 while the lower ends of the springs bear on the upper side of the clamping plate 46. In Fig. 2, wherein the ram is shown in raised position, it will be seen that when the ram is in raised position, the clamping plate is supported on collars 55 integrally formed with the lower ends of the rods 49, while in Fig. 1, wherein the ram is in its lower position, the clamping plate rests on the upper surface of the upper die member 27. It will be apparent that, as the piston 43 begins its downward movement, the clamping plate 46 will be brought to bear on the upper surface of the die section 27 and thus will hold the sections together as the extrusion pressure is developed by the ram 32. Thereafter, as will be explained, the ram itself provides the necessary clamping pressure.

The upper die member 27 is provided with a cylindrical aperture 56 which, in cooperation with the interior of a raised annular portion 57 integrally formed with this die member, forms an extrusion chamber in which the ram 34 is receivable, a cylindrical recess 58 being formed in the lower side of the clamping plate 46 to receive the raised portion 57. A runner 59 extends from the central portion of the extrusion chamber to a molding cavity 60 which is partially formed in each of the die sections 26 and 27, as shown in Fig. 1. It will be noted that a pair of steam ducts 61 are formed in the clamping plate 46 and are connected at their right ends, as shown in Fig. 2 by a cross duct 62 to permit circulation of steam through the clamping plate to maintain it at the desired temperature.

In the operation of this apparatus, after a cable end has been properly positioned within the die cavity and a quantity of molding material placed in the extrusion chamber, the die sections are slid into place under the ram 34, and the piston 43 is actuated to move the ram 34 downward. The size of the extrusion chamber, and particularly the horizontal cross sectional area thereof, is made large with respect to the horizontal cross sectional area of the molding cavity so that the pressure exerted by the ram against the molding material in the extrusion chamber tending to force the upper die section downward and clamp it against the lower die section will exceed the hydrostatic pressure, developed within the molding cavity and tending to open the cavity, by a substantial margin. During the first part of the extrusion or injection stroke, as hereinbefore stated, the clamping pressure required to press the die sections together is largely supplied by the springs 48. Thereafter, as the pressure increases in the extrusion chamber, the ram provides the required clamping pressure. In this way the one ram 34 serves both to clamp the die sections together and to develop the required injection molding pressure.

At the completion of the extrusion operation and after the molding material has been permitted to set as required, the piston 43 is reversed and the ram 34 lifted. A pair of vertically disposed retaining plates 63 are mounted on either side of the platen 17 and each plate is provided with an inwardly projecting portion 64 which engages an upper side edge of the upper die section preventing it from moving upward as the ram is lifted.

After the ram has been completely elevated, carrying with it, in the last portion of its upward movement, the clamping plate 46, the die with the completed part therein is slid to the right along the platen 17, as viewed in Fig. 2, to a mechanism which separates the die sections. A handle 66 is attached to the right side of the lower die section, as viewed in this figure, to facilitate moving the die. The die is guided by the platen retaining plates 25 and is moved to the right until the lower die section engages a vertically disposed movable stop pin 67 which is positioned in an aperture 68 formed in the left portion of the platen 17 and which, when fully elevated, projects substantially above the surface thereof. As shown in Fig. 2, however, the pin 67 is in its lower position so as to permit moving the lower die section to an unloading station as will be hereinafter explained. The lower end of the pin 67 is mounted on one end of a horizontally disposed, pivotally mounted beam 70, the opposite end of which pivotally supports a second vertically disposed stop pin 71 which is movable in an aperture 72 formed in the platen 17 and extending substantially parallel to the aperture 68. A stud shaft 73 mounted on a lug 74, which is mounted on the underside of the platen 17, pivotally supports the beam 70 at a point approximately midway between the stop pins and the beam is thus so positioned that when one stop pin is in elevated position, the other will be lowered so as not to project above the surface of the platen 17.

After the right edge of the lower die has been moved into engagement with the pin 67, a lever arm 75 is operated to elevate four vertically disposed shafts 76 which extend through apertures 77 formed in the platen 17 and the upper ends of which are engageable with the lower side of the upper die section 27. As may be seen in Fig. 1, the upper die section is substantially wider than the lower die section and the projecting areas are provided with recesses 78 to receive reduced portions 80 of the shafts 76. The lower ends of the shafts 76 are mounted on a plate 81, which is in turn supported on a link arm 82, pivotally attached to a lug 83 integrally formed with the base of the plate. The lower end of the link arm 82 is pivotally mounted on a crank arm 84, which is oscillated by the lever arm 75, both being supported and keyed to a common shaft 85. The shaft 85 is journalled in bearing blocks 86 mounted on a block 87 which is fixed to the table 8.

When the shafts 76 have been fully raised, the upper die section is completely removed and disassembled thereby from the lower die section, which is prevented from moving upward therewith by the retaining plates 25, hereinbefore described. At the same time that the shafts 76 are elevated, a threaded stop member 88 mounted in the plate 80 engages the lower left side of the beam 70 and causes the beam to pivot in a clockwise direction, thus lowering the stop pin 67 while raising the stop pin 71. This permits the lower die section to be slid out from under the upper die section and to the right. A stop pin 90 is slidably mounted in an aperture 91 formed in the right end of the platen 17 and prevents the lower die section from accidentally being removed from the platen but may be moved downwardly against the pressure of a spring 92 associated therewith to permit the lower die section to be removed should it be desired to do so.

After the lower die section has been moved out from under the upper die section, the molded article is then removed from the lower die section, completing a cycle of operation. Thereafter, commencing a new cycle of operation, a new cable end is positioned in the cavity in the lower die section and the lower die section is moved to the left until its left end engages the stop pin 71, thus positioning it immediately under the upper die section 27. A pin 94, carried by a rod 95 slidably disposed within the tubular lever arm 75 is then moved out of a notch 96 formed in a plate 97, carried by the block 87, to permit the lever arm 75 to be moved to the left, thus lowering the upper die section and assembling the die sections. As the shafts 76 are lowered, the pin 71 is moved downwardly and the die sections may then be slid to the left along the platen 17 and moved into position under the ram 32.

While but one embodiment of this invention has been shown and described, it will be understood that many changes and modications may be made therein without departing from the spirit and scope of the present invention.

What is claimed is:

1. A molding apparatus comprising a ram, a sectional die having an upper and a lower section and a die cavity formed therebetween, said upper section projecting over the edge of said lower section, an elongated heated platen under said ram and extending outwardly therefrom for supporting said die in a molding position, in a die disassembling position and in a die unloading position and for maintaining the lower section of said die at the required molding temperature, a plurality of vertically movable shafts positioned adjacent said ram for engaging the projecting portions of the upper die section and lifting this section off the lower section, means for holding said lower section on said platen during the disassembling operation, a stop member for aligning said die sections with respect to said shafts, means for elevating said shafts, and means operable in response to the elevating of said shafts for lowering said stop member to permit the lower die section to be moved along said platen to an unloading position.

2. In a molding apparatus, a sectional molding die having a die cavity formed therein and an extrusion chamber connected to said cavity by a runner, a movable ram receivable in said extrusion chamber for extruding molding material from said chamber into said cavity and having a cross-sectional area sufficiently greater than the cross-sectional area of the molding cavity so that the clamping pressure exerted by the ram during the extrusion stroke will exceed the hydrostatic pressure developed in the cavity thereby and act to hold the die sections closed, and means resiliently mounted on said ram for movement therewith and in advance thereof for applying an initial clamping pressure to said die to hold said die sections together during the first part of the extrusion stroke, said initial clamping force being insufficient to act as a holding pressure during the latter part of the extrusion stroke.

3. In a molding apparatus, a sectional die having a cavity formed therein and an extrusion chamber in one section of the die connected to said cavity by a passage, a movable ram for transferring molding material from said extrusion chamber to said cavity and for maintaining said die sections closed during the molding operation, said ram having a cross-sectional area greater than the cross-sectional area of the cavity of said die so that the clamping pressure exerted by the ram during the extrusion stroke will exceed the hydrostatic pressure developed in the cavity thereby, a member resiliently carried by said ram and movable therewith for engaging one section of said die in advance of the ram to apply an initial clamping force to said die sections to hold said die sections closed during the first part of the extrusion stroke, said initial clamping force being insufficient to act as a holding pressure during the latter part of the extrusion stroke.

4. A molding apparatus comprising a ram, a movable sectional die having an upper and a lower section, an elongated platen under said ram and extending outwardly therefrom for supporting said sectional dies in a plurality of positions thereon, means adjacent said ram for opening and closing said die sections, means for holding said lower die section on said platen, means including a movable stop member for aligning said die with said die opening and closing means and permitting movement of said die in one direction, means including a movable stop element for aligning said die with said die opening and closing means and permitting movement of said die in the opposite direction, and means for rendering said stop member and said stop element alternately effective and ineffective to stop said die in response to the die closing and opening operations.

5. In a molding apparatus, a movable sectional molding die having an upper section and a lower section forming a die cavity therebetween, an extrusion chamber formed in the upper die section and communicating with said die cavity, a movable ram for extruding molding material from said extrusion chamber into said die cavity, said ram having a cross-sectional area greater than the cross-sectional area of the die cavity for maintaining said die section closed during the extrusion stroke, a platen for supporting said movable sectional die, means for aligning said sectional die with said ram, a pressure plate engageable with said upper die section, means for yieldingly mounting said pressure plate on said ram for movement therewith and in advance thereof whereby the pressure plate may engage and apply a clamping force to said upper die section to maintain said die sections tightly closed during the initial portion of said extrusion stroke of said ram, said clamping force being insufficient to act as a holding pressure during the latter part of the extrusion stroke, and fixed means carried by said platen for engaging said upper die section to prevent the separation of said die sections while said ram is being withdrawn from said extrusion chamber.

6. In a molding apparatus, a molding die having an upper section and a lower section and a die cavity formed therebetween, said upper section having an extrusion chamber connected to said die cavity, a ram for transferring molding material from said extrusion chamber to said cavity, an elongated platen under said ram and extending outwardly therefrom for supporting said molding die in a molding position, a die operating position and a loading position, lifting means carried by said platen at said die operating position engageable with the upper die section, means for actuating said lifting means to lift the upper die section from the lower die section, means for holding said lower die section on said platen, a normally effective stop member to stop said die in alignment with said lifting means and to prevent movement of said die to and from said die separating position and said loading position, a normally ineffective stop member to stop said die in alignment with said lifting means and to prevent movement of said die to and from said die separating position and said molding position, means interconnecting said stop members to cause either one of said stop members to become ineffective when the other one is moved to its effective position, and means for actuating said stop members to selectively cause either one of said stop members to become effective.

ANTON J. BRUNNER.